United States Patent [19]
Sziklas et al.

[11] Patent Number: 5,289,492
[45] Date of Patent: Feb. 22, 1994

[54] SCALABLE LASER SYSTEM USING A COUPLED MULTIPLE OUTPUT RESONATOR

[75] Inventors: Edward A. Sziklas, Camden, Me.; Gary E. Palma, Bloomfield, Conn.

[73] Assignee: United Technologies Corporation, Hartford, Conn.

[21] Appl. No.: 955,810

[22] Filed: Oct. 2, 1992

[51] Int. Cl.$^5$ ................................. H01S 3/08
[52] U.S. Cl. ........................ 372/92; 372/19; 372/99
[58] Field of Search ............ 372/19, 92, 96, 97, 372/99, 108

[56] References Cited

U.S. PATENT DOCUMENTS

| | | | |
|---|---|---|---|
| H99 | 8/1986 | Jones et al. | 372/108 |
| 3,969,685 | 7/1976 | Chenausky et al. | 331/94.5 |
| 3,969,688 | 7/1976 | Freiberg et al. | 331/94.5 |
| 4,025,172 | 5/1977 | Freiberg | 350/294 |
| 4,135,787 | 1/1979 | McLafferty | 350/294 |
| 4,170,405 | 10/1979 | Sziklas | 350/299 |
| 4,516,244 | 5/1985 | Holmes | 372/99 |
| 4,606,036 | 8/1986 | Holmes | 372/95 |
| 4,682,339 | 7/1987 | Sziklas et al. | 372/108 |
| 4,841,541 | 6/1989 | Sziklas et al. | 372/94 |

Primary Examiner—Rodney B. Bovernick
Assistant Examiner—Robert E. Wise
Attorney, Agent, or Firm—Gerald L. DePardo

[57] ABSTRACT

A Coupled Multiple Output Resonator (CMOR) having two symmetric modules 10,20, is created by adding self-feedback (SFB) mirrors 104,106 aligned with apertures 100,102, in output scraper mirrors 14,24, respectively, to a conventional Multiple Output Resonator (MOR). The SFB mirrors re-inject a portion of the output beams 34,42 back into the resonator cavity as adjoint beams 108,110 which alter the modes of the system such that the CMOR only lases at desired modes where all the output beams 34,42 are in-phase. The CMOR provides substantially constant acceptable mode discrimination for more than 4 modules with only one SFB mirror per module and no additional external coupling paths between modules, thereby allowing the system to be scaled to any number of lasers without reduction of target intensity. Also, the SFB mirrors are small and are easily controlled to compensate for cavity mirror variations to maintain the desired mode discrimination.

6 Claims, 4 Drawing Sheets

SCALABLE LASER SYSTEM USING A COUPLED MULTIPLE OUTPUT RESONATOR

Statement as to Rights to Inventions Made Under Federally Sponsored Research and Development The U.S. government has a paid-up license in this invention and the right in limited circumstances to require the patent owner to license others on reasonable terms as provided for by the terms of contract No. F29601-85-C-0127 awarded by the Air Force Weapons Laboratory (AFWL; or Department of the Air Force, Phillips Laboratory, Kirtland Air Force Base).

TECHNICAL FIELD

This invention relates to high energy lasers and more particularly to scalable coupled multiple output resonators.

BACKGROUND ART

It is known in the field of high-powered lasers that if N individual lasers, each having a single output and sufficient self-feedback (SFB) to sustain lasing action, are each focused on a distant target, the peak intensity seen at the target will be equal to $N \times I$; where N is the number of lasers and I is the intensity of a single laser. However, if the N lasers are coupled, i.e., phase-locked or running at the same frequency or mode, such that the phase between output beams is a constant, and they are in-phase with each other, the intensity seen at the target will be $N^2 \times I$ (i.e., the coherent sum).

One way of providing $N^2 I$ output intensity is to use coupled standing wave resonators, as is discussed in U.S. Pat. No. 4,682,339, to Sziklas et al., entitled "Laser Array Having Mutually Coupled Resonators". In that case, each individual standing wave resonator has a bi-directional optical coupling signal going from one laser to the next, i.e., mutual feedback (MFB). However, to maintain phase lock, the cavity length of each laser must be kept to within approximately $\pm \lambda/20$, of an integer multiple of a wavelength of each other (depending on the number of lasers and type of coupling used). It is difficult to achieve this level of cavity length matching due to vibration and thermal effects and because it requires controlling large, e.g., 1 foot in diameter, water-cooled mirrors for high-power lasers.

Another way of achieving $N^2 I$ output intensity at a distant target is to use one large laser cavity (i.e., not individual lasers), such as a folded cavity, and tap-off output beams at various different locations in the cavity. Such a laser is called a Multiple Output Resonator (laser) or MOR, as is known. The advantage of using an MOR is that minor changes in the main resonator cavity length do not affect the coherence (or phaseability; discussed hereinafter) of the output beams because they are inherently coupled by being part of the same cavity.

In a typical MOR, the output beams are tapped-off from physically different locations in the MOR cavity, and the MOR (like most lasers) lases at a plurality of optical frequencies or axial (or longitudinal) modes spaced in frequency by the well known equation c/2L, where c is the speed of light, and L it the total length of the entire MOR cavity. The MOR may also be viewed as a number (N) of "modules", or "elements", i.e., symmetric cavities that make-up the larger MOR cavity. Thus, N modules in an MOR is analogous to N coupled standing wave resonators.

For a symmetrically configured MOR with two modules and, thus, two output beams, output scraper mirrors are positioned such that for a given frequency (or mode), and odd multiples of c/2L therefrom (called "odd modes" herein), the output beams are 180 degrees out of phase with each other. Similarly, in a symmetric MOR, the output beams are physically spaced such that at frequencies equal to the even multiples of c/2L (called "even modes" herein) from the same given frequency the output beams are in-phase with each other. Thus, although the spectral content of each output beam is identical (i.e., same frequency spacing and power output), the phase distribution for each spectral line is not identical. In general, this spectral phase mismatch renders the output beams "unphaseable".

More specifically, for a two-module, dual output beam MOR, the adjacent axial modes of the combined output beams are either in-phase (i.e., even modes) or 180 degrees out of phase (i.e., odd modes). Consequently, simultaneous operation of the MOR laser on adjacent axial modes precludes coherent superposition of the two output beams. Therefore, when the beams are interfered at the target, the even modes form an interference pattern with a peak (or node) in the center, and the odd modes form a pattern with a null (or antinode) in the center. Thus, when the two intensities are combined the resultant peak intensity seen at the target is NI, not the desired $N^2 I$.

One way to restore phaseability to the output beams of the MOR is to add cumbersome external delay lines, one for each output, to make it appear as though the output beams are being tapped-off from the same location in the cavity.

It is known that the characteristic equation (or denominator of the transfer function) of a laser system typically has complex roots (or eigenvalues) one corresponding to each mode (i.e., each resonating/lasing optical frequency). It is also known that the magnitude of each eigenvalue provides an indication of the optical loss (or feedback loss) per pass around the laser cavity for a given mode. The greater the magnitude of the eigenvalue, the lower the feedback loss. Also, the phase of each eigenvalue provides an indication of the actual lasing frequency or mode.

For a small number of coupling lasers (e.g., less than four), the phaseability problem of the MOR does not exist for coupled standing wave resonators. The act of coupling not only serves to phase-lock (i.e., frequency-lock) the lasers, but also makes the system operate on a single set of "supermodes" (different than the modes of an individual standing wave laser). Also, the coupling modifies the mode spectrum from a single standing wave resonator such that one set of supermodes has less loss (i.e., greater eigenvalue magnitude) than all others; thus, the laser system will only lase at those supermodes (frequencies). Further, each member of a supermode set has the same output phase distribution. Thus, for a system with less than four lasers the lasers will naturally lase on a dominant supermode set that ensures all the beams will be in-phase with each other for all the adjacent supermodes in the lasing supermode set.

However, in order to maintain a constant acceptable eigenvalue magnitude (or loss) difference for coupled resonators with more than four coupled lasers, each laser must be coupled to every other laser in the system, typically called "tight" coupling. Such a coupling configuration gets quite complex and cumbersome for a large number of lasers because of the high number of interconnects between lasers. This is especially true for high power, physically large lasers, e.g., lasers that are about 20 feet long.

If a coupling configuration other than tight coupling is used for coupled resonators, such as "series" coupling (where each laser is only coupled to adjacent lasers in the system), the eigenvalue magnitude difference decreases (like $1/N^2$) as the number N of lasers increases. Thus, as the number of lasers increases, it becomes more difficult to distinguish between one mode and another, and the system will begin to lase at modes that cause phaseability problems.

In the case of the MOR, the eigenvalues are all the same magnitude for any number of lasers. Thus, the eigenvalue magnitude difference is essentially zero and the MOR will lase at both the even and the odd modes (discussed hereinbefore).

Therefore, it is desirable to achieve a coupled laser system having a large number of lasers (e.g., greater than four) that provides the $N^2I$ intensity effect, that is not highly sensitive to cavity length variations and does not require precise control of cavity lengths. Also, it is desirable to have a system that has an acceptable eigenvalue magnitude (or loss) difference which allows the laser to lase only at the desired modes and has an loss difference that remains substantially constant (or above a desired threshold) as the number of lasers is increased, thereby providing a "scalable" laser system, i.e., a laser system that may be scaled to any number of lasers while maintaining the desired $N^2I$ intensity scaling of the coherent sum.

DISCLOSURE OF INVENTION

Objects of the invention include provision of a Coupled Multiple-Output Resonator (CMOR) which is minimally sensitive to cavity length variations, which provides output beams that lase at desired modes and are in-phase with each other, which has minimal number of interconnects, and which is scalable, i.e., may be scaled to any number of lasers without loss of target intensity.

According to the present invention, a Coupled Multiple Output Resonator (CMOR) comprises a multiple output resonator having at least two modules; a plurality of output beams each from an associated one of such modules; a plurality of self-feedback means each for re-injecting a portion of one of such output beams associated with such modules back into such resonator as adjoint beams which represent substantially the phase of such output beams and act to alter the modes of the system such that the CMOR will only lase at desired modes where all such output beams are in-phase.

According further to the present invention such self feedback means comprises a self-feedback mirror. According still further to the invention, the SFB mirrors are movable to compensate for motion of the resonator mirrors.

The invention solves the problem of making multiple outputs of an MOR run in-phase (i.e., not a 180° out of phase) by the addition of small self-feedback (SFB) mirrors which are easily controlled. The SFB mirrors make the outputs run on the even modes, which are the desired modes of the system.

The invention provides mode discrimination (eigenvalue magnitude difference) that remains at an acceptable level as the number of lasers increases and also remains substantially constant. Consequently, the CMOR system may be scaled to any number of lasers while maintaining the desired $N^2I$ intensity scaling of the coherent sum seen at the target.

Also, the coupling configuration with the CMOR is less complex than that required for coupled standing wave resonators where each laser must be connected to each other laser (i.e., tight coupling) to achieve similar mode discrimination properties. Furthermore, the use of small mirrors is far superior to the requirements of coupled resonators where large cavity mirrors must be adjusted to achieve phaseability of the output beams.

Furthermore, when scaling to higher powers, the bandwidth of the control system design for controlling mirror movement may stay the same because the mode discrimination (or sensitivity to mode change) does not substantially change as the number of lasers in the system increases. Thus, a control design that works for a four laser system will also work with an infinite number of lasers.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
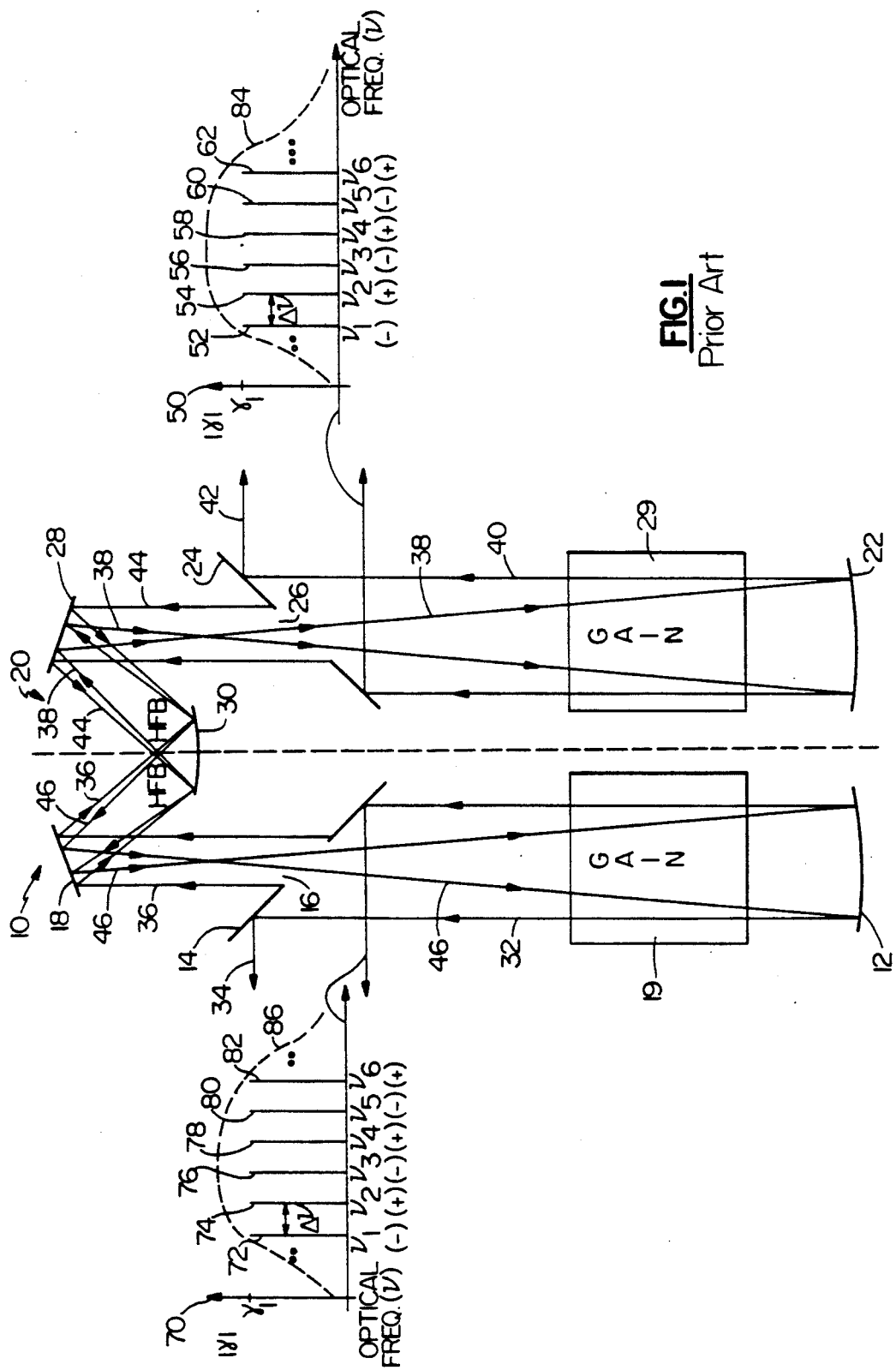
FIG. 1 is a diagram of a multiple output resonator (MOR) of the prior art having two output beams, showing the phase distribution of each output beam spectrum.

Referring to FIG. 1, a prior art multiple output resonator (MOR) comprises a folded cavity which can be viewed as two smaller symmetric cavities or "modules" 10,20. The module 10 comprises a main curved resonator mirror 12, an output scraper mirror 14 with an aperture 16, a flat turning mirror 18, and a gain medium 19. Symmetrically, the module 20 comprises a main curved resonator mirror 22, an output scraper mirror 24 with an aperture 26, a flat turning mirror 28, and a gain medium 29. Both modules 10,20 share a common main curved resonator mirror 30.

A wave 32 is collimated between the mirror 12 and the output scraper mirror 14. An outer portion beam 34 of the collimated beam 32 is reflected to the left as the output beam 34 and an inner portion beam 36 of the collimated beam 32 passes through the aperture 16 of the mirror 14 upwardly to the turning mirror 18. The flat turning mirror 18 redirects the collimated beam 36 downwardly and to the right to the curved mirror 30 which converts the collimated beam 36 to a focussed beam 38 and directs the beam 38 upwardly and to the right to the flat turning mirror 28. The numeral 38 will be used to indicate both the converging and diverging portions of the focussed beam 38 within the module 20.

The turning mirror 28 directs the focussed beam 38 downwardly and through the aperture 26 of the output scraper mirror 24 and through the gain medium 29, e.g., a $CO_2$ laser mixture discharge or a chemical laser gain medium like HF (hydrogen fluoride), which amplifies the light intensity but does not alter its shape, as is known. The diverging portion of the focussed beam 38 is reflected off the curved mirror 22 which converts the focussed beam 38 to a collimated beam 40. The collimated beam 40 passes upwardly, along the same path as the focussed beam 38, through the gain medium 29, where the light is again amplified, to the scraper mirror 24, where an outer portion beam 42 of the collimated beam 40 is reflected to the right and a collimated inner portion beam 44 of the collimated beam 40 passes upwardly through the aperture 26 of the mirror 24.

The collimated beam 44 is reflected off the flat turning mirror 28 downwardly and to the left to the shared curved mirror 30 which converts the collimated beam 44 into a focussed beam 46 and directs the beam 46 upwardly and to the left to the flat turning mirror 18. The numeral 46 will be used to indicate both the converging and diverging portions of the focussed beam 46 within the module 10.

The turning mirror 18 directs the focussed beam 46 downwardly through the aperture 16 of the output scraper mirror 24 and through the gain medium 19, similar to the gain medium 29, where the light is amplified. The diverging portion of the focussed beam 46 is reflected off the curved mirror 12 which converts the focussed beam 46 to the collimated beam 32. The collimated beam 32 passes upwardly, along the same path as the focussed beam 46, through the gain medium 19 where the light is again amplified and the beam 32 begins another trip around the laser cavity.

The common curved mirror 30 is where mutual coupling between the two modules occurs. The mirror 30 converts the collimated beam 44 from the module 20 to the focussed beam 46 which acts as the feedback beam to the module 10. At the same time, the mirror 30 converts the collimated beam 36 from the module 10 to the focussed beam 38 which acts as the feedback beam to the module 20. Thus, the coupling path created by the shared mirror 30 provides mutual feedback (MFB) coupling between adjacent modules. The bi-directional beams incident on and reflecting off the mirror 30 are referred to as MFB beams.

The output beam 42 of the MOR has an optical frequency $\nu$ spectrum, part of which is shown in a plot 50. The modes or resonant frequencies are indicated by spectral lines 52.62 at corresponding optical frequencies $\nu_1$–$\nu_6$, and the spectral lines have associated eigenvalue magnitudes $|\gamma|$ which, for an MOR, are all at same value $\gamma_1$ (as discussed hereinbefore). Similarly, the output beam 34 has an optical frequency spectrum, part of which is shown in a plot 70. The modes are indicated by spectral lines 72–82 at the same corresponding optical frequencies $\nu_1$–$\nu_6$ as the output beam 42, and the spectral lines have associated eigenvalue magnitudes $|\gamma|$ which, for an MOR, are all the same value $\gamma_1$, just like the output beam 42.

The frequency spacing $\Delta\nu$ between spectral lines for both outputs 34,42 is $c/2L$ where L is the length of the whole cavity between the mirrors 12,22, and c is the speed of light; or $c/2NL_1$ where $L_1$ is the length of one module, e.g., between the mirror 12 and the common mirror 30, each module being the same length, and N is the number of modules. Thus, for the embodiment of FIG. 1, the spacing is $c/4L_1$.

However, the phase distribution of the output beam 42 is different from that of the output beam 34. For example, using the output beam 42 as a reference beam, the phase difference at the frequency $\nu_1$ between the output beam 42 the output beam 34 is 180 degrees, because the output beams 34,42 are tapped-off at different places in a common cavity that are physically separated in space by a distance that corresponds to a phase shift of 180 degrees at the frequency $\nu_1$. Also, at the optical frequency $\nu_2$, the physical distance between the two outputs 34,42 is such that no phase shift exists between the output beam 34 and the output beam 42.

Symmetrically, at the optical frequency $\nu_3$, the physical distance between the two outputs 34,42 is such that 180 degree phase shift exists between the output beam 34 and the output beam 42. Also, at the optical frequency $\nu_4$, the physical distance between the two outputs 34,42 is such that no phase shift exists between the output beam 34 and the output beam 42. Therefore, the phase distribution of the two output beams 34,42 across the frequency spectrum is not the same for each output beam.

Due to symmetry of the 2 modules in FIG. 1, the "modes" of the 2 module system consist of two types: "positive modes" (or (+), or even modes) in which the output beam 34 is in-phase with the output beam 42, and "negative modes" (or (−), or odd modes) in which the output beam 34 is 180 degrees out-of-phase with the output beam 42. It should be understood that these mode types consider both output beams collectively.

Because the eigenvalue magnitude is the same value $\nu_1$ for all the frequencies $\nu_1$–$\nu_6$ shown, the system will lase at all the frequencies $\nu_1$–$\nu_6$ shown. Thus, the system of FIG. 1 will lase in both the even and the odd modes.

It should be understood that the frequency response of the gain medium must also be superimposed on the spectral lines as indicated by dashed lines 84,86 on the plots 50,70, respectively. Only those spectral lines corresponding to frequencies with sufficient gain will lase, as is known. Also, more or less spectral lines than those shown may actually lase, depending on the shape of the gain curve and the cavity length.

Because the output beams 34,42 are out of phase at every other optical lasing frequency (for the two laser configuration), when the output beams are combined, the resultant interference pattern exhibits a peak (i.e., a node) in the center of the pattern when in-phase, and no peak in the center (i.e., a null or anti-node) with two half power peaks not in the center when not in-phase. The resultant combined pattern provides a total intensity of NI, not the desired $N^2I$ (as discussed hereinbefore).

Figure 2:
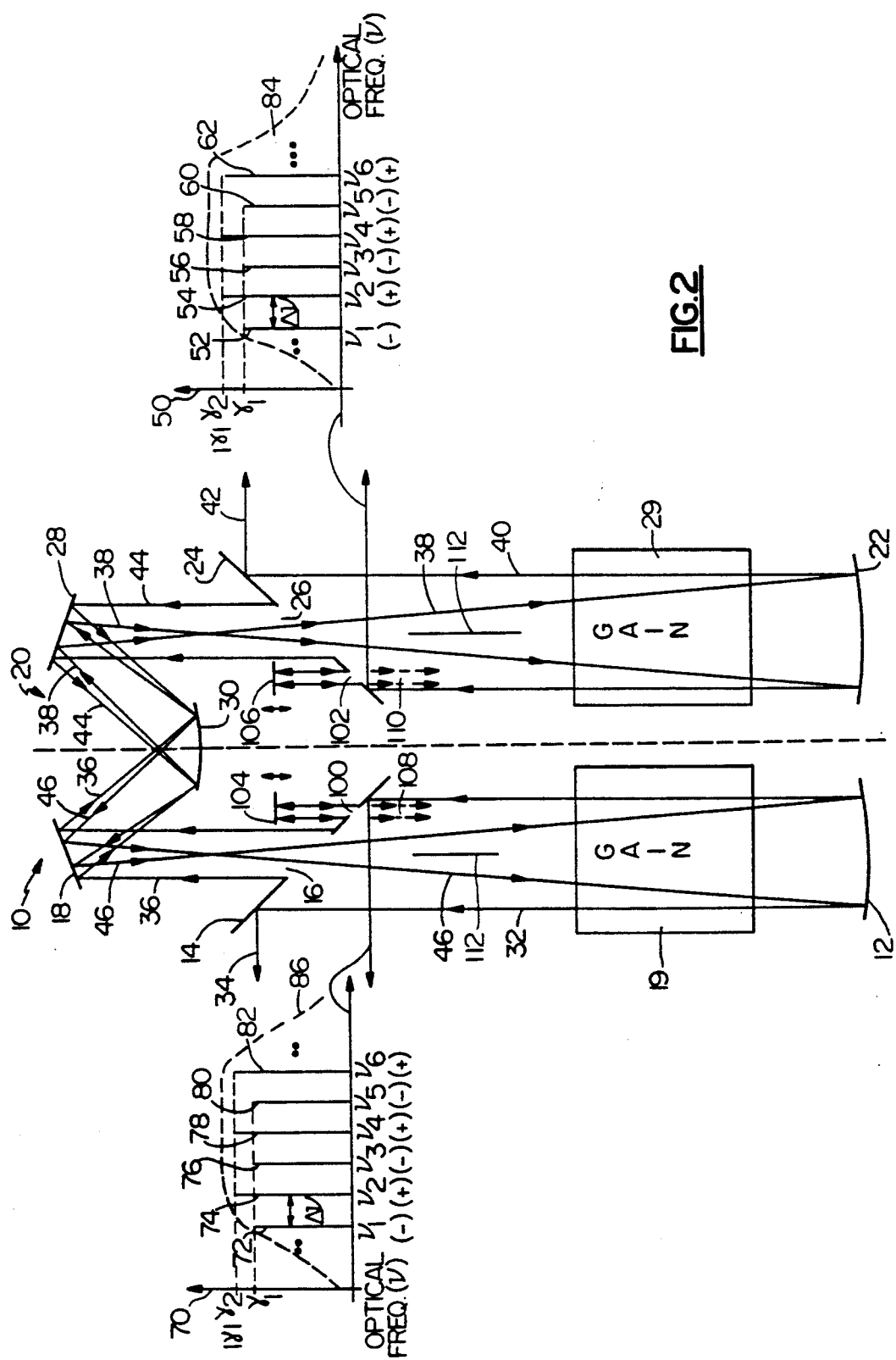
FIG. 2 is a diagram of a coupled multiple output resonator (CMOR) having two output beams, and two self-feedback mirrors, and showing the phase distribution of each output beam spectrum, in accordance with the present invention.

Referring now to FIG. 2, the invention comprises the addition of two apertures 100,102, one in each of the output scraper mirrors 14,24, respectively, and two small flat reflecting mirrors 104,106 aligned with the apertures 100,102, respectively.

The mirrors 104,106 serve to inject a portion of the output beams 34,42, respectively, back into the system as "adjoint" beams 108,110, respectively.

An adjoint beam, as is known, is a beam that demagnifies on each round trip around the cavity and propagates opposite to the magnifying beams in a laser. The magnifying beam, as is known, are those beams indicated by the solid lines in FIG. 1. The concept of an adjoint wave is discussed in commonly owned U.S. Pat. No. 4,841,541 to Sziklas et al, entitled "Coupling of Ring Lasers". More specifically, the adjoint beams 108,110 are collimated where the magnifying beam in the same direction is focussed, and focussed where the magnifying beam in the same direction is collimated.

After a sufficient number of bounces around the laser cavity, the adjoint waves 108,110 converge to a line along the optical axis 112, (i.e., the center line between the resonator mirrors of the laser). At the same time, the adjoint waves diffractively expand from the optical axis and naturally excite the magnifying waves, as is known.

The adjoint beam 110, from the mirror 106, has the phase of the output beam 42 and the adjoint beam 108, from the mirror 104, has the phase of the output beam 34. Continuing with the same example used to explain FIG. 1, at the optical frequencies $\nu_1, \nu_3$, etc. (i.e., the (−) modes), the difference between the output beams 34,42 is 180 degrees; thus, the adjoint beams 108,110 tend to cancel each other. However, at the optical frequencies $\nu_2, \nu_4$, etc. (i.e., the (+) modes), there is no phase difference between the output beams 34,42; thus, the energy from the adjoint beams adds together to ultimately affect the magnifying beams in the laser.

The presence of the adjoint beams 108,110 has the effect of altering the characteristic equation of the laser cavity to increase the eigenvalue magnitudes from $\gamma_1$ (as in FIG. 1) to $\gamma_2$, for the (+) modes only (i.e., not the (−) modes). Due to the eigenvalue magnitude difference, the MOR will lase only at the (+) modes. Thus, the output beams 34,42 will be in-phase for all the output optical frequencies. Because the invention forces the output beams to be coupled in-phase, the invention is called a Coupled Multiple Output Resonator (CMOR).

Thus, for a two module system, the invention has altered the modes of the system from an optical lasing frequency spacing of $c/4L_1$ to $c/2L_1$, thereby removing the group of odd (−) modes, i.e., the undesirable modes that cause phaseability problems.

More generally, for a N module system, the invention has altered the modes of the system from an optical lasing frequency spacing of $c/2NL_1$ (where N is the number of modules) to $c/2L_1$, thereby removing N−1 groups of undesired modes that cause phaseability problems. It should be understood that the nomenclature of "odd" and "even" modes only applies when the system has only two modules. For an N module system, there will be only one group of modes (called desired modes) where all the outputs will be in-phase, and N−1 groups of modes (called undesired modes) where the outputs will not be in-phase.

An alternative way to describe the effect of the invention is that the small mirrors 104,106 provide self-feedback (SFB) into the system which couples into the mutual-feedback (MFB) that exists between the two modules 10,20 at the shared mirror 30. The SFB changes the eigenvalue spectrum to suppress all modes except the desired modes. For a two module system, if the SFB from the mirror 104 is called $SFB_1$, if the SFB from the mirror 106 is called $SFB_2$, and if the relative amount of each SFB is the same, i.e., $SFB_1 = SFB_2$, the total feedback TFB may be defined as follows:

$$TFB = MFB \pm (SFB_1 + SFB_2) \quad \text{(eq. 1)}$$

where the SFB's add to the MFB in the even modes, and subtract from the MFB in the odd modes. Also, the TFB is related to eigenvalue magnitude, as is known. Consequently, the eigenvalue magnitudes associated with the even modes are increased and the eigenvalue magnitudes associated with the odd modes are decreased, thereby providing mode discrimination and allowing the laser to lase only at the desired even modes. Therefore, the more SFB that is used in the system, the more mode discrimination that is achieved by the system.

For a system with more than 2 modules we have found that the eigenvalue magnitudes associated with the desired modes will be increased and the eigenvalue magnitudes associated with the undesired modes having the closest magnitudes to the desired modes, remain substantially unchanged, while other undesired modes are decreased. For systems with a large number of modules, increasing the desired modes to be greater than the undesired modes provides sufficient mode discrimination to allow the laser to lase only at the desired modes.

We have found that there is no need to equalize the lengths of individual resonator modules within the CMOR, as is required for coupled standing wave resonators. Instead, the small SFB mirrors 104,106 are actively adjusted or controlled to compensate for motion in the large resonator mirrors 12,22,18,28,30. The tolerance on the position of the SFB mirrors is on the order of $\lambda/4$ (modulo $2\pi$) where $\lambda$ is the wavelength of the laser light. This tolerance requirement is nearly a factor of five less stringent than that required for coupled resonators, and can be achieved using much smaller mirrors which are easier to control. Thus, the mirrors may be controlled by a known piezoelectric modulator which provides precise positioning of a mirror.

The SFB mirrors may be moved together or individually depending on the motion of the resonator mirrors. For example, for a perfectly symmetric system, the SFB positions will be as shown in FIG. 2. However, if the resonator mirror 22 moves, the modes of the system change and the SFB mirrors are repositioned to allow the adjoint beams 108,110 to add in-phase to retain the desired eigenvalue magnitude difference. There will always be a set of SFB mirror positions where all the adjoint beams will add in-phase to provide the same eigenvalue magnitude difference as before the resonator mirror moved. Thus, while the frequency of the modes of the system (and thus the phase of the eigenvalues) may have changed due to a cavity length change, the eigenvalue magnitude of each mode remains the same once the SFB mirrors have been repositioned. Also, because the SFB mirrors are small, the system can easily track high frequency motions of the resonator mirrors.

Figure 3:
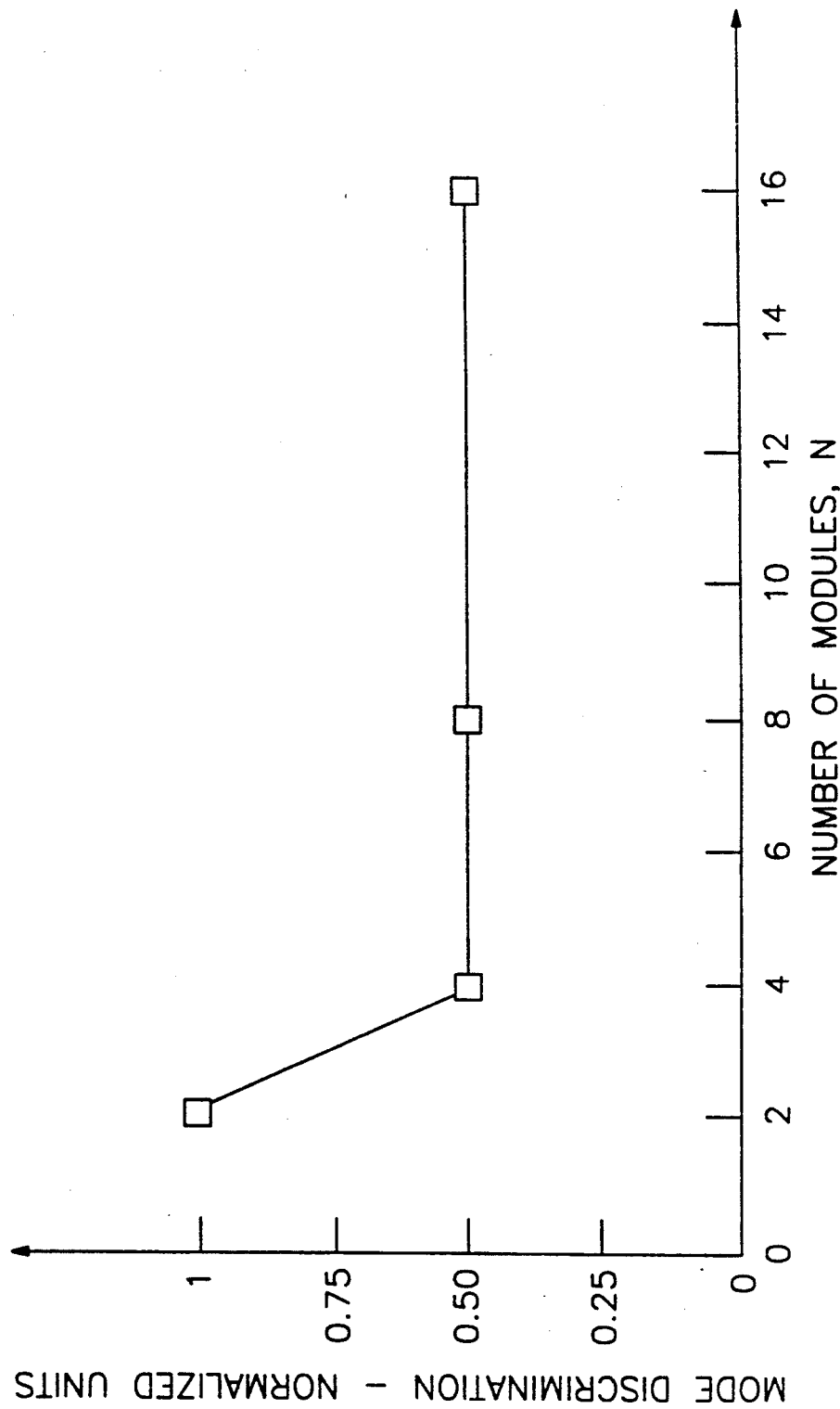
FIG. 3 is a graph of normalized mode discrimination (or eigenvalue magnitude difference) against number of CMOR modules, showing the scalability of the CMOR system, in accordance with the present invention.

Referring now to FIG. 3, we have found that as the number of modules (N) increases above four, the eigenvalue magnitude loss becomes a constant value at an acceptable level to provide adequate mode discrimination. The vertical axis is normalized mode separation defined by the equation:

$$\frac{|\gamma_{(d)}|^2 - |\gamma_{(u)}|^2}{|\gamma|^2} \quad \text{(eq. 2)}$$

where $\gamma_{(d)}$ represents the one group of desired modes to lase at; $\gamma_{(u)}$ are the N−1 groups of undesired modes; and $\gamma$ represents the modes of an MOR system without any SFB mirrors. FIG. 3 shows the CMOR system may be scaled to any number of lasers and the eigenvalue magnitude difference will not substantially change to an unacceptably low level. Because the sensitivity remains substantially constant, the control system controlling the mirrors (not shown in FIG. 2), need not change its response characteristics as the number of modules in the system increases.

The number of SFB mirrors required for an N module CMOR to achieve the mode discrimination of FIG. 3 is only N (i.e., one for each module) and no additional external coupling paths between modules need be added over that of a conventional MOR. However, for conventional coupled resonators to achieve this same level of discrimination, requires "tight" coupling, i.e., each laser coupled to every other laser in the system (as discussed hereinbefore), which corresponds to $N(N-1)/2$ external coupling paths. Thus, the invention provides substantial advantage over the conventional approach of using coupled standing wave resonators.

Figure 4:
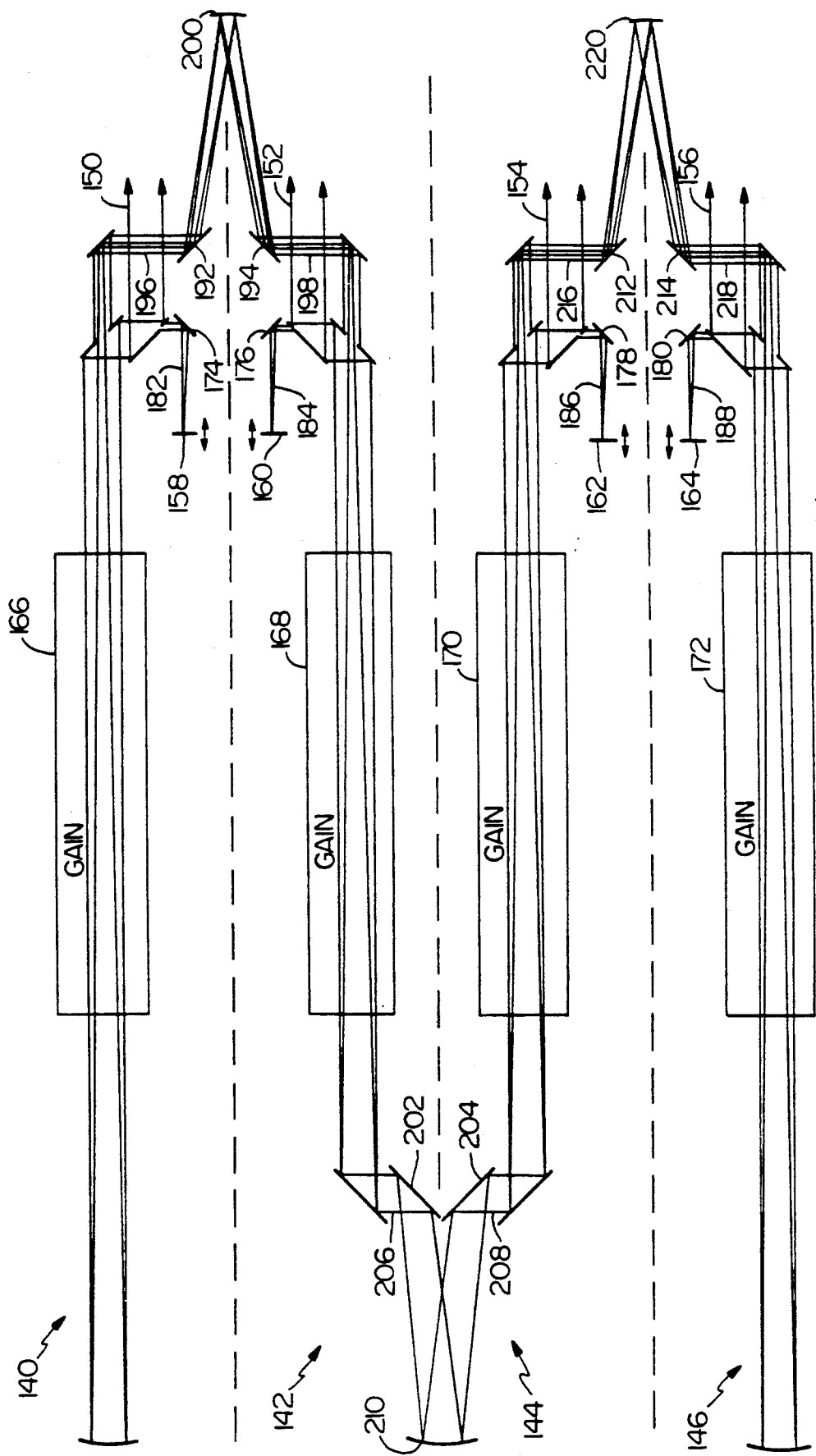
FIG. 4 is a diagram of a CMOR with 4 modules, in accordance with the present invention.

Referring now to FIG. 4, a CMOR with 4 modules 140,142,144,146 having output beams 150,152,154,156, comprises SFB mirrors 158,160,162,164, respectively, and gain stages 166,168,170,172, respectively, similar to the gains previously discussed. The basic optical configuration of each module is the same as for the two-module case of FIG. 2.

Additional turning mirrors 174,176,178,180 have been added to divert their respective SFB optical paths 182,184,186,188, horizontally, as indicated. Also, turning mirror 192 (in the module 140) and turning mirror 194 (in the module 142), have been added to divert bi-directional MFB beams 196,198, respectively, to a common curved mirror 200. Similarly, turning mirrors 202,204 have been added to divert bi-directional MFB beams 206,208, respectively, to a common curved mirror 210. Also, turning mirrors 212,214 have been added to divert bi-directional MFB beams 216,218, respectively, to a common curved mirror 220. It should be understood by those skilled in the art that these additional turning mirrors have no effect on the operation of the invention.

It should be understood by those skilled in the art that for more than 2 modules (i.e., N>2), some of the SFB mirrors actually provide a combination of mutual-feedback (i.e., radiation that passes through more than one module) as well as self-feedback. For example, in FIG. 4, the SFB mirrors 158,164, in the modules 140,146, respectively, provide all self-feedback, and the SFB mirrors 160,162, in the modules 142,144, respectively, provide a combination of mutual-feedback and self-feedback.

For optimal mode discrimination, i.e., maximum eigenvalue magnitude difference, one SFB mirror should be placed in each module.

Although the invention has been illustrated using two and four modules, it should be understood by those skilled in the laser art that extension of the CMOR concept to N>4 is straight forward.

Also, although the invention has been described as using an SFB mirror to provide self-feedback beams, any device that accepts a portion of an output beam and re injects it into the system as an adjoint beam, representing substantially the phase of that output beam, will suffice.

Also, instead of having one gain medium in each CMOR module, less or more gain mediums may be used provided sufficient amplification is provided to overcome the losses due to the extraction of the output beams, as is known.

Even though the invention has been described as being used with a resonator having collimated output beams and some collimated internal resonator beams (i.e., a confocal resonator), it should be understood that the invention will work equally well with a resonator having non-collimated output beams or no collimated beams anywhere in the system (i.e., a non-confocal resonator).

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A coupled multiple output resonator (CMOR) system, comprising:
    a multiple output resonator comprising at least two modules coupled together by mutual feedback beams, said resonator having a magnifying beam and having at least one optical gain medium;
    a plurality of output beams each being tapped-off from an associated one of said modules;
    said resonator being capable of lasing at desired lasing modes where said output beams are all in-phase, and undesired lasing modes where said output beams are not all in-phase: and
    a plurality of self-feedback means, each for re-injecting a portion of one of said output beams associated with said one of said modules, as an adjoint wave, representing substantially the phase of said one of said output beams, back into said resonator, thereby increasing the magnitude of the eigenvalues of said desired lasing modes to be greater than said undesired lasing modes and providing adequate mode discrimination therebetween, for any number of said modules, such that said resonator only lases at said desired modes, and allowing all of said output beams to be substantially in-phase at all lasing modes of said resonator, such that the system may be scaled to any number of modules while maintaining said adequate mode discrimination.

2. The CMOR system of claim 1 wherein said self-feedback means comprises a self-feedback mirror.

3. The CMOR system of claim 1 wherein the distance from said resonator to said self-feedback means is adjustable.

4. The CMOR system of claim 1 wherein at least one of said plurality of self.feedback means is disposed in each of said modules.

5. The CMOR system of claim 1 wherein said adequate mode discrimination remains substantially constant for any number of said modules greater than a predetermined number.

6. The CMOR system of claim 5 wherein said predetermined number of said modules is four.

* * * * *